(12) United States Patent
Tsai

(10) Patent No.: US 7,619,956 B2
(45) Date of Patent: Nov. 17, 2009

(54) STABILITY OF A WRITE CONTROL SIGNAL (76) Inventor: Chin-Yin Tsai, 8F, No. 533, Chung-Cheng Rd., Hsin-Tien, Taipei (TW)

( * ) Notice: Subject to any disclaimer, the term of this patent is extended or adjusted under 35 U.S.C. 154(b) by 708 days.

(21) Appl. No.: 10/990,655

(22) Filed: Nov. 17, 2004

(65) Prior Publication Data
US 2005/0105436 A1 May 19, 2005

Related U.S. Application Data
(60) Provisional application No. 60/520,711, filed on Nov. 17, 2003.

(51) Int. Cl.
G11B 7/00 (2006.01)
(52) U.S. Cl. .................. 369/53.37; 369/53.26; 369/116
(58) Field of Classification Search .............. 369/53.37, 369/53.26, 116
See application file for complete search history.

(56) References Cited

U.S. PATENT DOCUMENTS

| | | | |
|---|---|---|---|
| 4,512,004 A | 4/1985 | Nonaka | |
| 4,707,648 A | 11/1987 | Minami et al. | |
| 4,707,816 A | 11/1987 | Yonezawa et al. | |
| 4,878,211 A | 10/1989 | Suzuki et al. | 369/44 |
| 5,029,155 A | 7/1991 | Kenjo | 369/116 |
| 5,216,659 A | 6/1993 | Call et al. | |
| 5,245,598 A | 9/1993 | Burroughs | |
| 5,297,114 A | 3/1994 | Itoh et al. | |
| 5,367,513 A | 11/1994 | Bates et al. | |
| 5,475,664 A | 12/1995 | Shimizume et al. | |
| 5,504,726 A | 4/1996 | Semba et al. | |
| 5,587,985 A * | 12/1996 | Sano et al. | 369/124.02 |
| 5,602,814 A * | 2/1997 | Jaquette et al. | 369/47.53 |
| 5,623,465 A | 4/1997 | Sasaki et al. | |
| 5,642,340 A | 6/1997 | Nomura et al. | |
| 5,710,748 A | 1/1998 | Hofer | |
| 5,732,052 A | 3/1998 | Ando et al. | |
| 5,748,584 A | 5/1998 | Maezawa et al. | |
| 7,349,310 B2 | 5/2005 | Tsai et al. | |
| 6,934,227 B2 * | 8/2005 | Nakata et al. | 369/44.32 |

(Continued)

FOREIGN PATENT DOCUMENTS
CN 1407552 4/2003

(Continued)

Primary Examiner—Wayne R Young
Assistant Examiner—Adam R Giesy
(74) Attorney, Agent, or Firm—Perkins Coie LLP

(57) ABSTRACT

A calibration method for improving stability of write control signal during writing can be applied in a CD recorder. The CD recorder has a pickup device having a laser diode, and a write control device for outputting a write control signal. A first relationship curve showing the relationship between the write control signal and a light-emitting power generated by the laser diode is obtained by switching the pickup device into a de-focus state and switching the write control device into a close-loop mode. A second relationship curve showing the relationship between a gain of the write control device and the write control signal is obtained by switching the write control device into a long-term open mode. When a specific light-emitting power is adapted to write, a specific write control signal and a specific gain corresponding to the specific light-emitting power is obtained according to the first and second relationship curves.

34 Claims, 6 Drawing Sheets

U.S. PATENT DOCUMENTS

| | | |
|---|---|---|
| 7,286,462 B2 | 10/2007 | Tsai et al. |
| 7,298,674 B2 | 11/2007 | Tsai et al. |
| 7,385,896 B2 | 6/2008 | Tsai et al. |
| 2003/0169649 A1 | 9/2003 | Takaoka et al. |
| 2005/0105436 A1 | 5/2005 | Tsai et al. |
| 2008/0205240 A1 | 8/2008 | Tsai et al. |
| 2009/0003163 A1 | 1/2009 | Tsai et al. |

FOREIGN PATENT DOCUMENTS

| | | |
|---|---|---|
| CN | 1519667 | 5/2005 |
| CN | 1619660 | 5/2005 |
| CN | 1619661 | 5/2005 |
| CN | 1619662 | 5/2005 |
| CN | 1619668 | 5/2005 |
| CN | 1629947 | 6/2005 |
| JP | 63117336 | 5/1988 |
| JP | 11-279637 | 3/1998 |
| JP | 63117336 | 5/1998 |
| JP | 2001067682 | 3/2001 |
| TW | 200518049 | 6/2005 |
| TW | 200518073 | 6/2005 |
| TW | 200518078 | 6/2005 |
| TW | 200518081 | 6/2005 |
| TW | 200522040 | 7/2005 |
| TW | 200518048 | 12/2006 |

* cited by examiner

FIG. 8

STABILITY OF A WRITE CONTROL SIGNAL

This application claims the benefit of U.S. provisional application Ser. No. 60/520,711, filed Nov. 17, 2003, the subject matter of which is incorporated herein by reference.

BACKGROUND OF THE INVENTION

1. Field of the Invention

The invention relates in general to a calibration method, and more particularly to a calibration method for improving stability of a write control signal during writing.

2. Description of the Related Art

Figure 1:
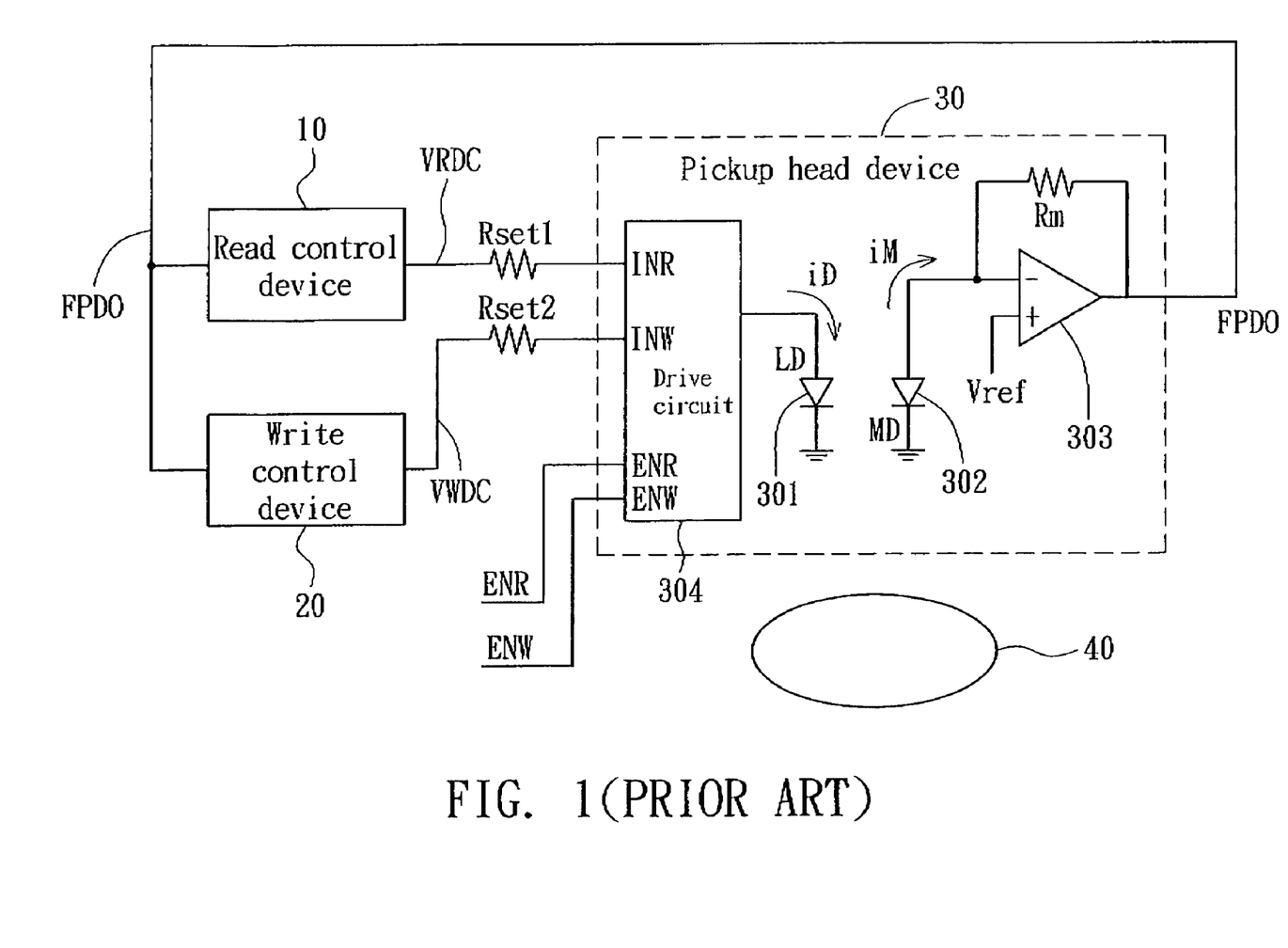
FIG. 1 is a block diagram showing a conventional CD recorder.

FIG. 1 is a block diagram showing a conventional CD recorder. Referring to FIG. 1, the CD recorder mainly has a read control device 10, a write control device 20 and a pickup head device 30. When a data reading process is to be performed, the read control device 10 generates a read control signal VRDC and outputs the signal VRDC to a drive IC 304 of the pickup head device 30. The drive IC 304 generates a current $i_D$ flowing through a laser diode 301 according to the read control signal VRDC so as to generate a laser beam to read a disk 40. When a data writing process is to be performed, the write control device 20 generates a write control signal VWDC and outputs the signal VWDC to the drive IC 304 of the pickup head device 30. The drive IC 304 generates a current $i_D$ according to the write control signal VWDC so as to generate a laser beam to write the disk 40.

Besides, A monitor diode 302 of the pickup head device 30 generates a current $i_M$ according to the laser beam sensed by the laser diode 301. A third amplifier 303 processes the current $i_M$ and then generates a feedback control signal FPDO. The feedback control signal FPDO is fed back to input terminals of the read control device 10 and the write control device 20 in order to control a light-emitting power generated by the laser diode 301 during the reading/writing process.

Figure 2:
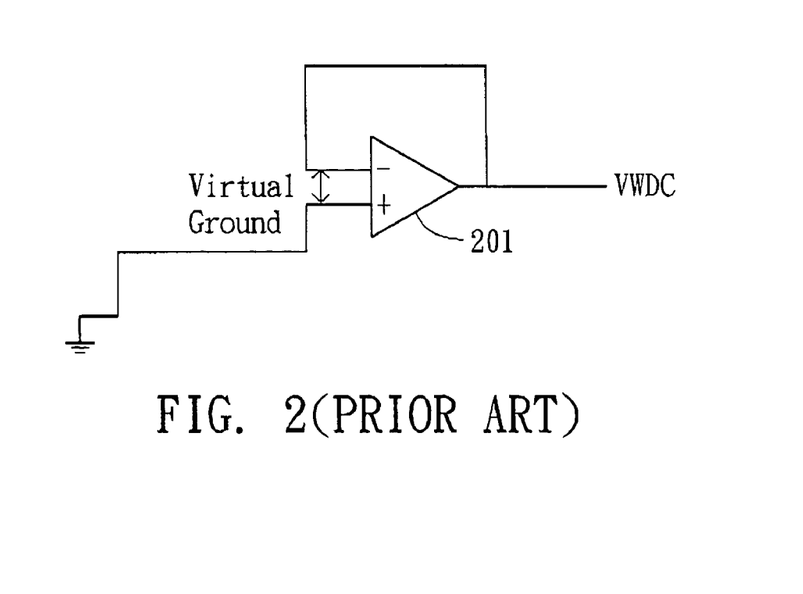
FIG. 2 is a circuit diagram showing a short-term open mode.
Figure 3:
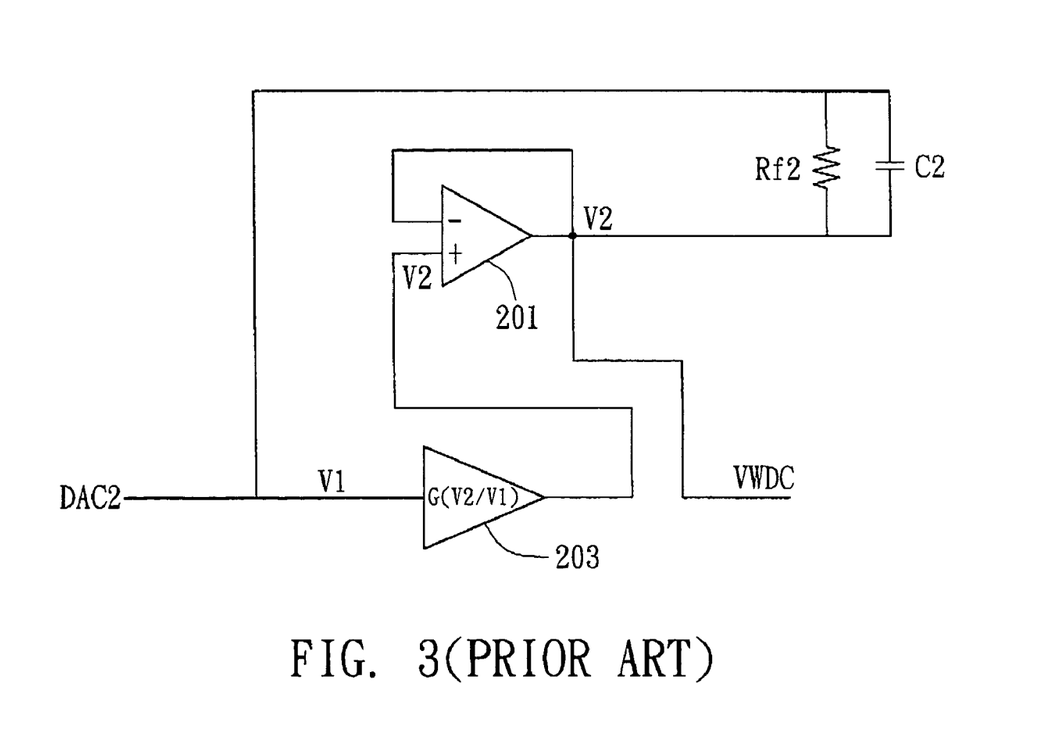
FIG. 3 is a circuit diagram showing a long-term open mode.
Figure 4:
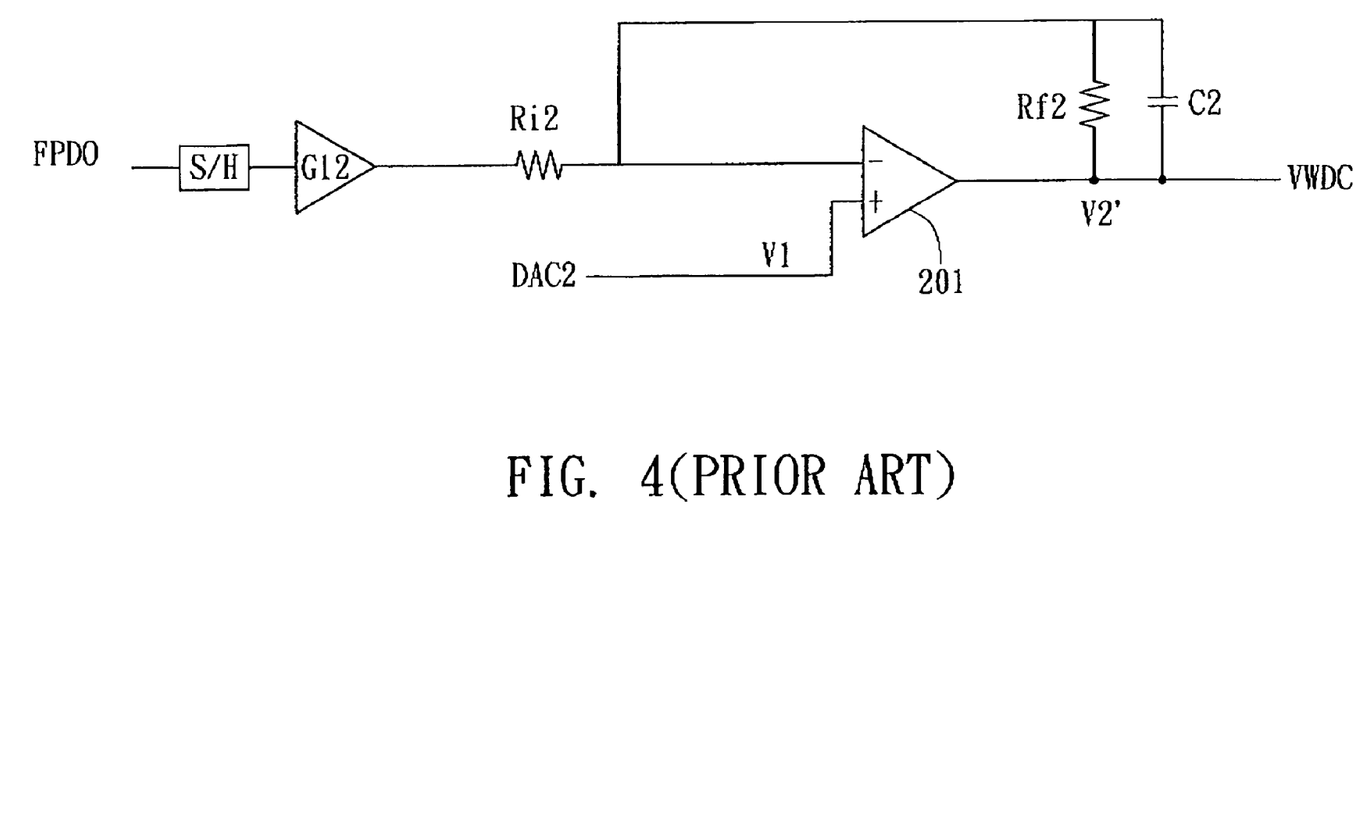
FIG. 4 is a circuit diagram showing a close-loop mode.

Please refer to the Taiwan patent application number 92100819, filed on Jan. 15, 2003 and entitled "Write Control Device and Method for Optical Storage Apparatus", which illustrates write control device 20 which has three working modes including a short-term open mode, a long-term open mode and a close-loop mode, as respectively shown in FIGS. 2, 3 and FIG. 4. In the short-term open mode shown in FIG. 2, the write control signal VWDC is initialized according to a virtual ground of a first amplifier 201, so that the potential of the write control signal VWDC become to zero. In the long-term open mode shown in FIG. 3, an analog signal DAC2 with a voltage level of V1 is inputted to a second amplifier 203. The gain G of the second amplifier 203 is V2/V1, and the second amplifier 203 outputs an output signal with a voltage level of V2 to the first amplifier 201 such that the first amplifier 201 outputs the write control signal VWDC of which the voltage level becomes V2. The analog signal DAC2 is the signal which influences the level of the write control signal VWDC. The analog signal DAC2 may be obtained using a DAC converter to convert a digital value. The digital value may be selected from one of a plurality of digital values stored in a memory. Different values determine different levels of the write control signal VWDC. In this long-term open mode, the write control signal VWDC can be rapidly charged to a voltage level V2 capable of performing writing toward the optical disk 40. In the close-loop mode in FIG. 4, after the feedback control signal FPDO is inputted to the write control device 20, a sample/hold unit S/H samples and holds the signal FPDO and amplifies the signal FPDO by G12 times. Then, the amplified signal is inputted to a negative input terminal of the first amplifier 201 through a resistor Ri2, while the analog signal DAC2 with a voltage level of V1 is directly fed to a positive input terminal of the first amplifier 201. The first amplifier 201 outputs the write control signal VWDC with a voltage level of V2' and feeds the signal VWDC back to the negative input terminal of the first amplifier 201 across the parallel connected resistor Rf2 and capacitor C2. In this close-loop mode, the write control signal VWDC controls the pickup head device 30 to write data into the optical disk 40.

Figure 5A:
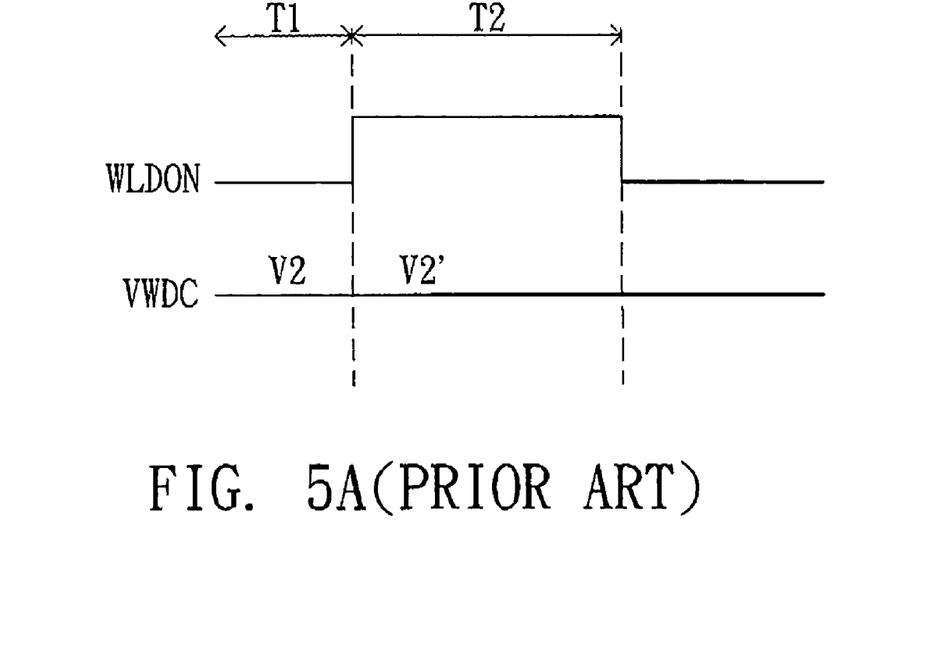
FIG. 5 shows signal waveforms of a time interval control signal and a write control signal.

Obviously, In an ideal state, V2' described above should be equal to V2. FIG. 5A shows signal waveforms of a time interval control signal WLDON and the write control signal VWDC when V2' is equal to V2. The time interval control signal WLDON is used to control the write control device 20. When the time interval control signal WLDON switches to a high level, the write control device 20 switches to the close-loop mode to perform the writing operation. Therefore, in the time slot T1, the time interval control signal WLDON is low, the write control device 20 enters the long-term open mode, and the level of the write control signal VWDC is V2. In the time slot T2, the time interval control signal WLDON switches to the high level, the write control device 20 enters the close-loop mode, and the level of the write control signal VWDC is V2'. Consequently, the write control signal VWDC is quickly charged to the voltage level V2 capable of writing the optical disk 40 in the long-term open mode, and then the write control signal VWDC is held at the voltage level V2' capable of writing the optical disk 40 (in an ideal state, V2'=V2) in the close-loop mode. Thus, the write error may be avoided when the optical drive is being written.

Figure 5B:
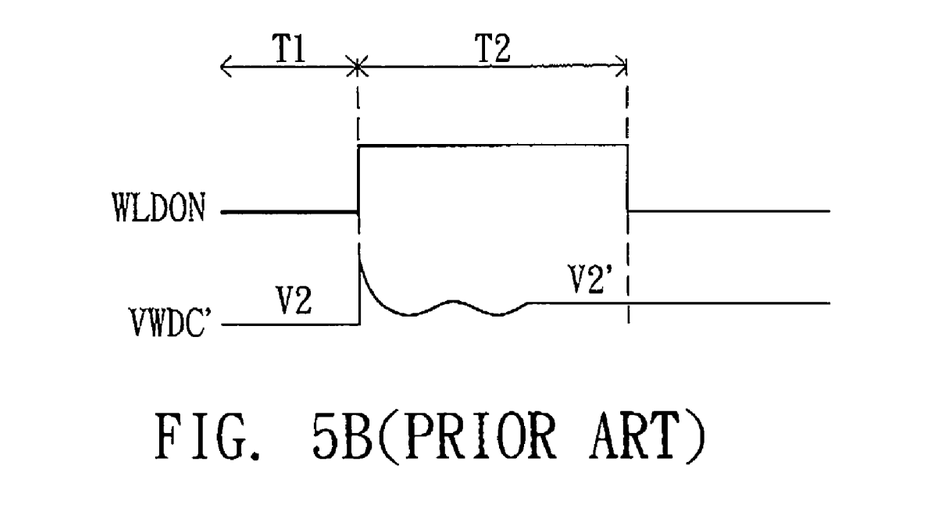

However, if the gain of the second amplifier 203 is not well designed, or the gain G of the second amplifier 203 is changed due to the influence of the environmental factor or temperature, V2' will not be equal to V2. FIG. 5B shows signal waveforms of the time interval control signal WLDON and the write control signal VWDC when V2' is not equal to V2. When V2' is not equal to V2 and the write control device 20 switches from the long-term open mode in the time slot T1 to the close-loop mode in the time slot T2, the write control signal VWDC may have a transient of unstable voltage, which may cause write error when the optical drive is writing the disk.

Besides, the conventional method for obtaining the gain G of the second amplifier 203 will be described in the following. An OPC (Optimum Power Control) calibration is firstly performed on a test area of the disk before the disk is written. The OPC calibration is to write the test area according different light-emitting powers of the laser diode. In the OPC calibration process, a most suitable light-emitting power for writing may be obtained, and the theoretical value of the gain of the second amplifier 203 may be evaluated according to the light-emitting power. Thereafter, the fixed theoretical value of the gain serves as the gain G of the second amplifier 203. In a CAV (Constant Angle Velocity) optical drive, however, when the writing speeds are different, different light-emitting powers have to be set. That is, different gains G have to be set to obtain different voltage levels V2 of the write control signal VWDC. Obviously, the conventional method cannot achieve the function of changing the gain G according to the writing speed, so this method may cause the unstable voltage of the write control signal VWDC and thus cause the data write error.

SUMMARY OF THE INVENTION

It is therefore an object of the invention to provide a calibration method for improving stability of a write control signal during writing, and the method can effectively improve unstable conditions of the voltage of the write control signal when a long-term open mode is switched to a close-loop mode so that the error of the data written into the disk may be avoided.

The invention achieves the above-identified object by providing a calibration method for improving stability of a write control signal during writing which can be applied in a CD recorder is provided. The CD recorder has a pickup device and a write control device for outputting the write control signal. The calibration method according to the preferred embodiment of the invention obtains a gain of the write control device. The gain is for controlling the write control signal, and the write control signal controls the pickup device to write a disk. The calibration method according to the preferred embodiment of the invention includes the following steps. First, the pickup device switches into a de-focus state. Then, the write control device switches into a close-loop mode, and a first relationship curve showing a relationship between the write control signal and a light-emitting power generated by a laser diode is obtained. Thereafter, the write control device switches into a long-term open mode and a second relationship curve showing a relationship between the gain and the write control signal is obtained. After the calibration is completed and when the pickup device adopts a specific light-emitting power to write, the CD recorder can obtain a specific write control signal corresponding to the specific light-emitting power according to the first relationship curve and further obtains a specific gain corresponding to the specific write control signal according to the second relationship curve, such that the write control signal outputted by the write control device outputs in the long-term open mode substantially equals the specific write control signal outputted by the write control device in the close-loop mode.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 6:
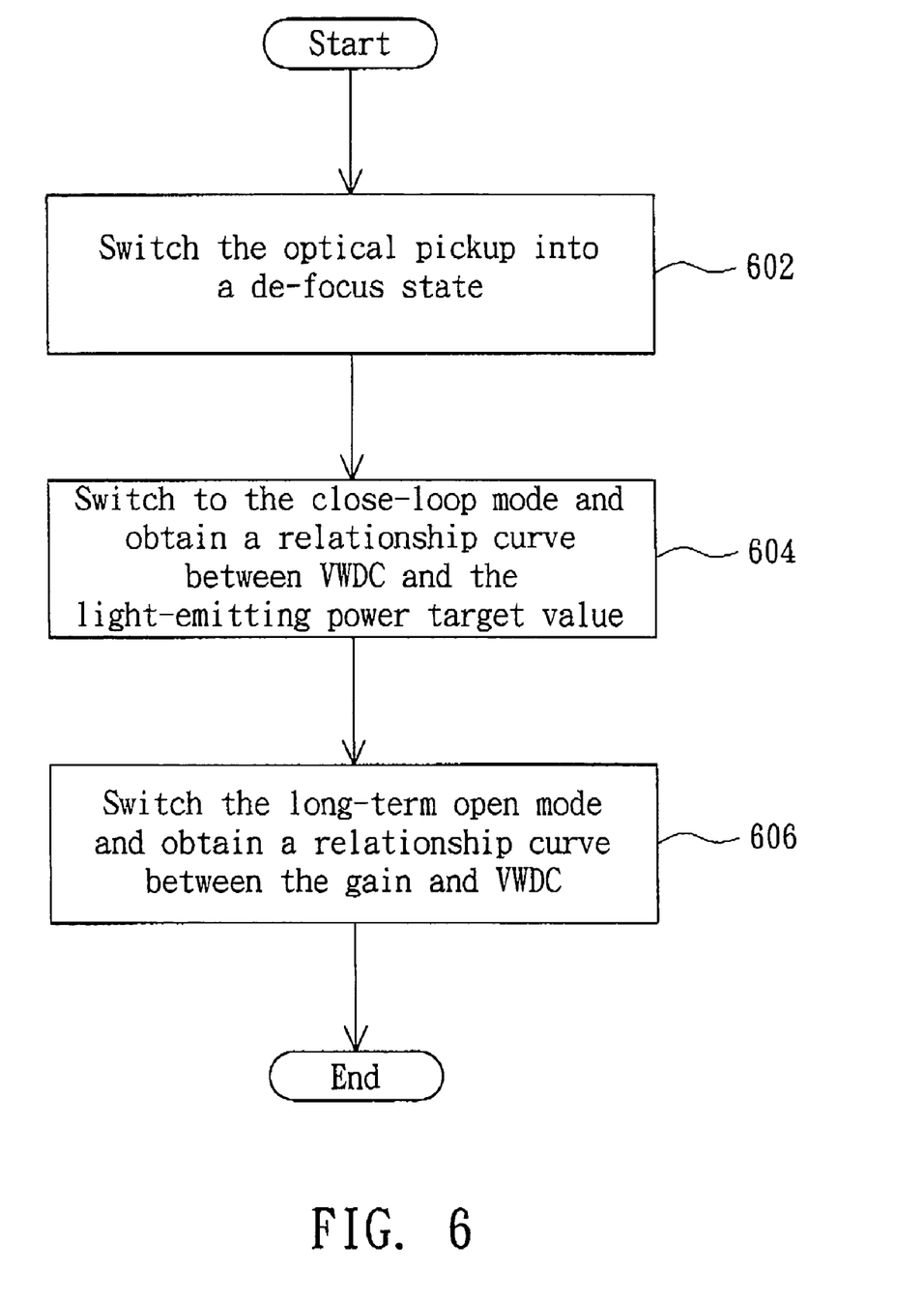
FIG. 6 is a flow chart showing a calibration method for improving stability of a write control signal during writing according to a preferred embodiment of the invention.

FIG. 6 is a flow chart showing a calibration method for improving stability of a write control signal during writing according to a preferred embodiment of the invention. The invention directly changes the states of an optical pickup 30 and a write control device 20 in an optical drive so as to perform a calibration process according to an on-line operation. First, in step 602, an optical pickup firstly switches into a de-focus state by, for example, moving the optical pickup to a lowest position such that the optical pickup cannot influence the state of the disk, that is, the data cannot be really written into the disk.

Next, in step 604, the write control device 20 switches to a close-loop mode, and a relationship curve showing a relationship between a voltage value of a write control signal VWDC and a light-emitting power target value generated by a laser diode 301 is obtained. Then, in step 606, the write control device 20 switches to a long-term open mode, and a relationship curve showing a relationship between a gain G of a second amplifier 203 and the voltage value of the write control signal VWDC is obtained.

Figure 7:
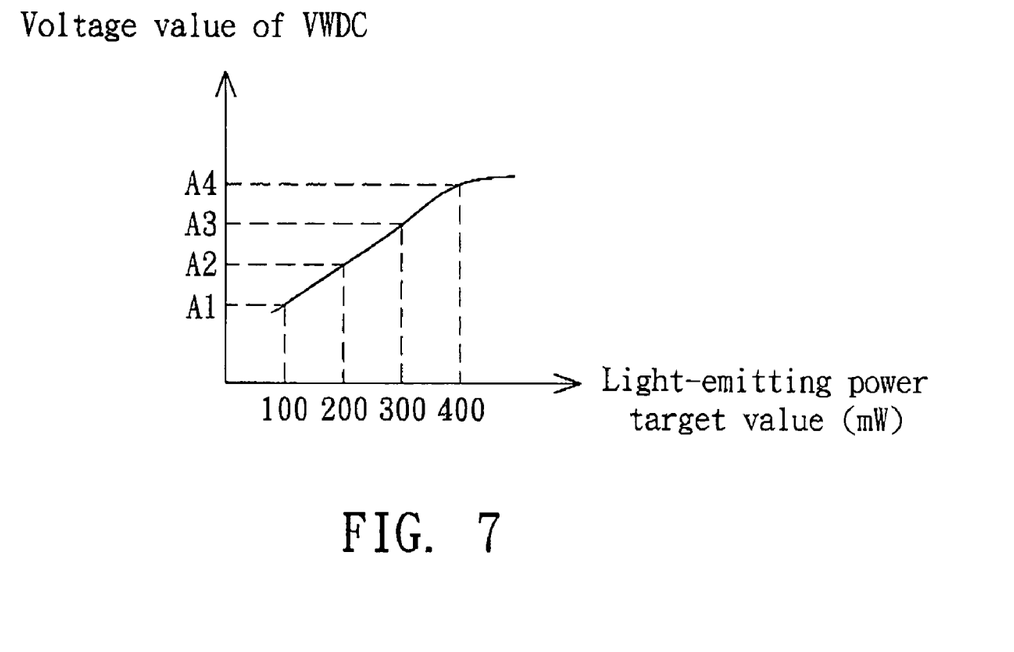
FIG. 7 is a curve showing a relationship between the write control signal and a light-emitting power target value.

FIG. 7 is a curve showing a relationship between the voltage value of the write control signal VWDC and a light-emitting power target value generated by the laser diode 301 in step 604. The relationship curve is obtained as follows. First, several light-emitting power target values, such as 100 mW, 200 mW, 300 mW and 400 mW, are set. Then, feedback control signals FPDO corresponding to the light-emitting power target values are fed back to a write control device 20 in the close-loop mode of FIG. 4, and voltage values of the write control signal VWDC, such as A1, A2, A3 and A4, which are outputted from the write control device 20 is measured. The voltage value of the write control signal VWDC may be a digital value obtained by converting a voltage level of the write control signal VWDC using a ADC (Analog to Digital Converter).

Figure 8:
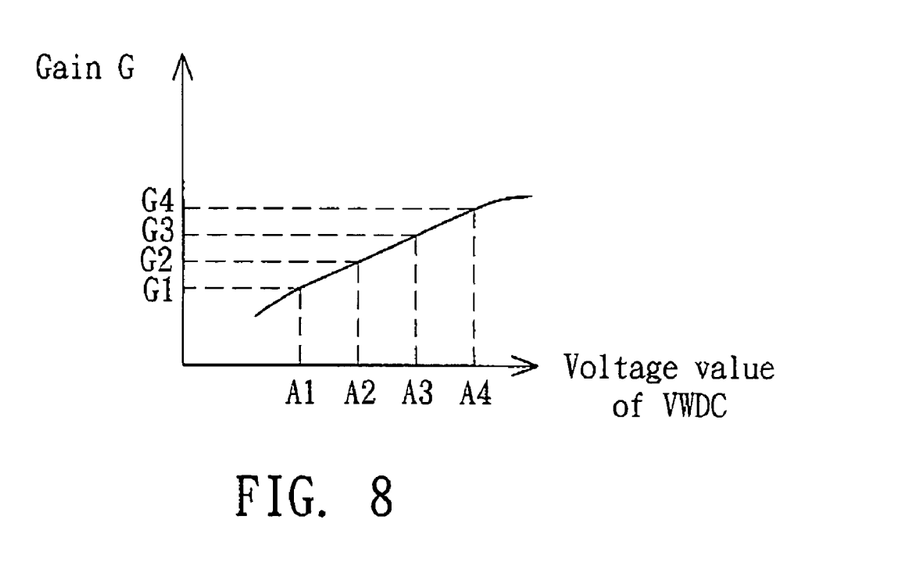
FIG. 8 is a curve showing a relationship between the write control signal and a gain of a second amplifier.

FIG. 8 is a curve showing a relationship between the voltage value of the write control signal VWDC and a corresponding gain G of a second amplifier 203 in step 606. The relationship curve is obtained by obtaining the corresponding gains of the second amplifier 203, such as G1, G2, G3 and G4, in the write control device 20 in the long-term open mode of FIG. 3 according to the measured voltage values of the write control signal VWDC, such as A1, A2, A3 and A4, when the voltage level of an analog signal DAC2 is a constant value such as V1. If the laser diode is asked to generate a specific light-emitting power to write the disk after the calibration, the voltage value of the write control signal VWDC corresponding to the specific light-emitting power in the close-loop mode may be quickly obtained according to the relationship curve of FIG. 7. Then, the gain G corresponding to the voltage value of the write control signal VWDC in the long-term open mode is obtained according to the relationship curve of FIG. 8.

For example, when the specific light-emitting power obtained through the OPC calibration is 200 mW, the corresponding voltage value of the write control signal VWDC can be obtained to be A2 by utilizing the relationship of FIG. 7. After that, the corresponding gain of the second amplifier 203 in the long-term open mode is obtained to be G2 by utilizing the voltage value A2 of the write control signal VWDC according to the relationship in FIG. 8. After regulating the gain of the second amplifier 203 during writing according to the obtained gain G2, the voltage value of VWDC can maintain stable during writing. Besides, for CAV optical drive, the relationship of voltage value V2 of VWDC can be generated according to different gain G (similar to FIG. 7 and FIG. 8), and the corresponding gain G for the needed light-emitting power can be obtained. By this way, the error during writing data can be reduced. The method according to the preferred embodiment of the invention can be performed before the optical drive leave the factory, or before writing data each time in regard to the situation. Person skilled in the art can modify that according to the factual application. All equivalent modifications or changes are in the scope of the invention.

The calibration method according to the embodiment of the invention can achieve the advantage of precisely controlling the gain G, such that when the write control device 20 switches from the long-term open mode to the close-loop mode, the write control signal VWDC still can be held at the fixed voltage level, as shown in FIG. 5A, and there is no error caused when the data is being written to the disk. In addition, when the method of the invention is applied to a CAV optical drive, different gains G may be quickly set according to different writing speeds so that different voltage levels V2 of the write control signal VWDC can be obtained.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A calibration method for improving stability of a write control signal during writing in a CD recorder, wherein the CD recorder has a pickup device and a write control device for outputting the write control signal, the calibration method obtains a gain of the write control device, the gain is for controlling the write control signal, and the write control signal controls the pickup device to write a disk, the calibration method comprising:
    switching the pickup device to a de-focus state;
    switching the write control device to a close-loop mode and obtaining a first relationship curve showing a relationship between the write control signal and a light-emitting power generated by a laser diode; and
    switching the write control device to a long-term open mode and obtaining a second relationship curve showing a relationship between the gain and the write control signal,
    wherein if the pickup device adopts a specific light-emitting power to write, the CD recorder performs a method comprising:
    obtaining a specific write control signal corresponding to the specific light-emitting power according to the first relationship curve; and
    obtaining a specific gain corresponding to the specific write control signal according to the second relationship curve, such that the write control signal outputted by the write control device in the long-term open mode substantially equals the specific write control signal outputted by the write control device in the close-loop mode.

2. The method according to claim 1 being performed in an on-line manner.

3. The method according to claim 2, wherein the switching the pickup device to the de-focus state comprises:
    moving an optical pickup to a lowest position such that the optical pickup cannot influence data to be written to the disk, wherein the optical pickup is located in the pickup device.

4. The method according to claim 3, wherein the switching the write control device to the close-loop mode and obtaining the first relationship curve comprises:
    setting a plurality of light-emitting power target values;
    generating a plurality of feedback control signals corresponding to the light-emitting power target values, wherein the feedback control signals is fed back to the write control device in the close-loop mode;
    measuring a plurality of write control signal target values corresponding to the feedback control signals; and
    obtaining the first relationship curve according to the light-emitting power target values and the write control signal target values.

5. The method according to claim 4, wherein the switching the write control device to the long-term open mode and obtaining the second relationship curve comprises:
    inputting the write control signal target values to a second amplifier, and obtaining a plurality of corresponding gain target values of a first amplifier of the write control device in the long-term open mode when a voltage level of an analog signal in the input terminal of the second amplifier is fixed; and
    obtaining the second relationship curve according to the write control signal target values and the gain target values.

6. The method according to claim 5, wherein in the close-loop mode, the write control device receives the feedback control signals and generates the specific write control signal to control the laser diode of the pickup device to write the disk.

7. The method according to claim 6, wherein in the long-term open mode, the write control signal is quickly charged to a voltage level capable of writing the disk, the write control device has the second amplifier, the second amplifier has the gain, and the gain is for controlling the write control signal.

8. The method according to claim 7, wherein when the CD recorder writes using the specific light-emitting power, the specific gain is obtained according to the first/second relationship curve such that the write control signal is charged to a level of the specific write control signal.

9. A calibration method for improving stability of a write control signal during writing in a CD recorder, wherein the CD recorder has a pickup device and a write control device, the pickup device has a laser diode and a monitor diode, the write control device outputs a write control signal to control the laser diode to generate a light-emitting power according to a gain, the light-emitting power is for writing a disk, and the pickup device generates a feedback control signal according to the light-emitting power sensed by the monitor diode, the calibration method comprising:
    switching the pickup device to a de-focus state;
    switching the write control device to a close-loop mode and obtaining a first relationship curve showing a relationship between the write control signal and the light-emitting power, wherein if the write control device is in the close-loop mode, a positive input terminal of a first amplifier of the write control device receives a voltage level, an output terminal of the first amplifier outputs the write control signal, the write control signal is further fed back and inputted, as a feedback control signal, to a negative input terminal of the first amplifier through a linear circuit, and the feedback control signal received by the negative input terminal is associated with the write control signal; and
    switching the write control device to a long-term open mode and obtaining a second relationship curve showing a relationship between the gain and the write control signal in the write control device, wherein in the long-term open mode, the write control device has the first amplifier and a second amplifier, which has the gain and receives the voltage level, and the voltage level and the gain are multiplied together to make a voltage value of an output signal of the second amplifier substantially equal to the write control signal,
    wherein if the pickup device adopts a specific light-emitting power to write, the CD recorder obtains a specific write control signal corresponding to the specific light-emitting power according to the first relationship curve, and the CD recorder further obtains a specific gain corresponding to the specific write control signal according to the second relationship curve, such that the write control signal outputted by the write control device in the long-term open mode substantially equals the specific write control signal outputted by the write control device in the close-loop mode.

10. The method according to claim 9 being performed in an on-line manner.

11. The method according to claim 10, wherein the switching the pickup device to the de-focus state comprises:
 moving an optical pickup to a lowest position such that the optical pickup cannot influence data to be written to the disk, wherein the pickup device has the optical pickup, and the optical pickup has the laser diode and the monitor diode.

12. The method according to claim 11, wherein the switching the write control device to a close-loop mode and obtaining the first relationship curve comprises:
 setting a plurality of light-emitting power target values;
 feeding a plurality of feedback control signals corresponding to the light-emitting power target values back to the first amplifier;
 measuring a plurality of write control signal target values corresponding to the feedback control signals; and
 obtaining the first relationship curve according to the light-emitting power target values and the write control signal target values.

13. The method according to claim 12, wherein the switching the write control device to the long-term open mode and obtaining the second relationship curve comprises:
 obtaining a plurality of corresponding target gains of the second amplifier of the write control device in the long-term open mode according to the write control signal target values and in a case an input terminal of the second amplifier is a constant voltage level; and
 obtaining the second relationship curve according to a relationship between the write control signal target values and the target gains,
 wherein if the write control device is in the long-term open mode, the second amplifier has an input terminal for receiving the constant voltage level, and an output terminal connected to a positive input terminal of the first amplifier, an output terminal of the first amplifier connected to a negative input terminal of the first amplifier outputs the write control signal, and the write control signal is further fed back and inputted to the input terminal of the second amplifier through a linear circuit.

14. A calibration method for improving stability of a write control signal during writing in an optical disk recorder, wherein the optical disk recorder has a pickup device and a write control device for outputting the write control signal, the calibration method comprising:
 obtaining a first relationship curve showing a relationship between the write control signal and a light-emitting power generated by a laser diode; and
 switching the write control device to a long-term open mode and obtaining a second relationship curve showing a relationship between a gain and the write control signal,
 wherein if the pickup device adopts a light-emitting power to write,
 obtaining a write control signal corresponding to the light-emitting power according to the first relationship curve; and obtaining a gain corresponding to the write control signal according to the second relationship curve, such that the write control signal outputted by the write control device in the long-term open mode at least approximately equals the specific write control signal outputted by the write control device in the close-loop mode.

15. An apparatus, comprising:
 means for obtaining a first relationship curve showing a relationship between a write control signal and a light-emitting power generated by a laser diode;
 means for switching a write control device to a long-term open mode and obtaining a second relationship curve showing a relationship between a gain and the write control signal;
 means for obtaining a write control signal corresponding to the light-emitting power according to the first relationship curve if the pickup device adopts a light-emitting power to write; and
 means for obtaining a gain corresponding to the write control signal according to the second relationship curve, such that the write control signal outputted by the write control device in the long-term open mode at least approximately equals the write control signal outputted by the write control device in the close-loop mode.

16. An apparatus, comprising:
 an optical pickup head configured to switch to a de-focus state; and
 a write control device configured to (a) switch to a close-loop mode, (b) obtain a first curve showing a relationship between a voltage value of a write control signal and a power target value generated by a laser diode, (c) switch to a long-term open mode, (d) obtain a second curve showing a relationship between a gain of an amplifier and the voltage value of the write control signal, and (e) output a write control signal in the long-term open mode that at least approximately equals a write control signal that is outputted in the close-loop mode.

17. The apparatus of claim 16 wherein the optical pickup head switches to the de-focus state by moving an optical pickup head to a lowest position such that data cannot be written to a disk.

18. The apparatus of claim 16 wherein the write control device is further configured to adjust the power target value generated by the laser diode to one of several values.

19. The apparatus of claim 16 further comprising an analog to digital converter configured to convert a voltage level of the write control signal to a digital value wherein the write control device obtains the second curve based on the digital value converted by the analog to digital converter.

20. The apparatus of claim 19 wherein the write control device is further configured to adjust a gain of the amplifier in the long-term open mode based on the digital value.

21. A method performed by an optical disk recorder for improving stability of a write control signal during writing, comprising:
 switching a pickup device of the optical disk recorder to a de-focus state;
 switching a write control device of the optical disk recorder to a first mode, the write control device configured to output a write control signal, and obtaining a first relationship curve showing a relationship between the write control signal and a light-emitting power generated by a laser diode; and
 switching the write control device to a second mode and obtaining a second relationship curve showing a relationship between the gain and the write control signal, wherein if the pickup device adopts a specific light-emitting power to write, the optical disk recorder performs a method comprising:
    obtaining a specific write control signal corresponding to the specific light-emitting power according to the first relationship curve; and
    obtaining a specific gain corresponding to the specific write control signal according to the second relationship curve, such that the write control signal outputted by the write control device in the second mode substantially equals the specific write control signal outputted by the write control device in the first mode.

22. The method of claim 21 being performed in an on-line manner.

23. The method of claim 22, wherein the switching the pickup device to the de-focus state comprises:
    moving an optical pickup to a lowest position such that the optical pickup cannot influence data to be written to the disk, wherein the optical pickup is located in the pickup device.

24. The method of claim 23, wherein the switching the write control device to the first mode and obtaining the first relationship curve comprises:
    setting multiple light-emitting power target values;
    generating multiple feedback control signals corresponding to the light-emitting power target values, wherein the feedback control signals is fed back to the write control device in the first mode;
    measuring multiple write control signal target values corresponding to the feedback control signals; and
    obtaining the first relationship curve according to the light-emitting power target values and the write control signal target values.

25. The method of claim 24, wherein the switching the write control device to the second mode and obtaining the second relationship curve comprises:
    inputting the write control signal target values to a second amplifier, and obtaining multiple corresponding gain target values of a first amplifier of the write control device in the second mode when a voltage level of an analog signal in the input terminal of the second amplifier is fixed; and
    obtaining the second relationship curve according to the write control signal target values and the gain target values.

26. The method of claim 25, wherein in the first mode, the write control device receives the feedback control signals and generates the specific write control signal to control the laser diode of the pickup device to write the disk.

27. The method of claim 21, wherein in the first mode is a close-loop mode.

28. The method of claim 21, wherein the second mode is a long-term open mode.

29. The method of claim 21, wherein the optical disk recorder employs the gain to control the pickup device to write to an optical disk via the write control signal.

30. A method performed by an optical disk recorder, comprising:
    switching a pickup device of the optical disk recorder to a de-focus state, the pickup device having a laser diode and a monitor diode;
    switching a write control device of the optical disk recorder to a first mode and obtaining a first relationship curve showing a relationship between the write control signal and the light-emitting power, the write control device outputting a write control signal to control the laser diode to generate a light-emitting power according to a gain, the light-emitting power for writing to an optical disk, the pickup device generating a feedback control signal according to the light-emitting power sensed by the monitor diode, wherein if the write control device is in the first mode, a positive input terminal of a first amplifier of the write control device receives a voltage level, an output terminal of the first amplifier outputs the write control signal, the write control signal is further fed back and inputted as a feedback control signal to a negative input terminal of the first amplifier through a linear circuit, and the feedback control signal received by the negative input terminal is associated with the write control signal; and
    switching the write control device to a second mode and obtaining a second relationship curve showing a relationship between the gain and the write control signal in the write control device, wherein in the second mode, the write control device has the first amplifier and a second amplifier, which has the gain and receives the voltage level, and the voltage level and the gain are multiplied together to make a voltage value of an output signal of the second amplifier substantially equal to the write control signal,
    wherein if the pickup device adopts a specific light-emitting power to write, the optical disk recorder obtains a specific write control signal corresponding to the specific light-emitting power according to the first relationship curve, and the optical disk recorder further obtains a specific gain corresponding to the specific write control signal according to the second relationship curve, such that the write control signal outputted by the write control device in the second mode substantially equals the specific write control signal outputted by the write control device in the first mode.

31. The method of claim 30 being performed in an on-line manner.

32. The method of claim 31, wherein the switching the pickup device to the de-focus state comprises:
    moving an optical pickup to a lowest position such that the optical pickup cannot influence data to be written to the disk, wherein the pickup device has the optical pickup, and the optical pickup has the laser diode and the monitor diode.

33. The method of claim 32, wherein the switching the write control device to a first mode and obtaining the first relationship curve comprises:
    selling multiple light-emitting power target values;
    feeding multiple feedback control signals corresponding to the light-emitting power target values back to the first amplifier;
    measuring multiple write control signal target values corresponding to the feedback control signals; and
    obtaining the first relationship curve according to the light-emitting power target values and the write control signal target values.

34. A method, comprising:
    obtaining a first relationship curve showing a relationship between a write control signal employed by an optical disk recorder during writing and a light-emitting power generated by a laser diode; and
    switching a write control device of the optical disk recorder to a second mode and obtaining a second relationship curve showing a relationship between a gain and the write control signal,
    wherein if a pickup device of the optical disk recorder adopts a light-emitting power to write, obtaining a write control signal corresponding to the light-emitting power according to the first relationship curve; and obtaining a gain corresponding to the write control signal according to the second relationship curve, such that the write control signal outputted by the write control device in the second mode at least approximately equals the specific write control signal outputted by the write control device in the first mode.

* * * * *

UNITED STATES PATENT AND TRADEMARK OFFICE
CERTIFICATE OF CORRECTION

| | | |
|---|---|---|
| PATENT NO. | : 7,619,956 B2 | Page 1 of 1 |
| APPLICATION NO. | : 10/990655 | |
| DATED | : November 17, 2009 | |
| INVENTOR(S) | : Tsai | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 798 days.

Signed and Sealed this
Twenty-eighth Day of December, 2010

David J. Kappos
*Director of the United States Patent and Trademark Office*